(12) United States Patent
Martensson et al.

(10) Patent No.: US 6,588,166 B2
(45) Date of Patent: *Jul. 8, 2003

(54) FLOORING PANEL OR WALL PANEL AND USE THEREOF

(75) Inventors: Goran Martensson, Klagstorp (SE); Magnus Kulik, Vellinge (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/770,395

(22) Filed: Jan. 29, 2001

(65) Prior Publication Data

US 2001/0034991 A1 Nov. 1, 2001

Related U.S. Application Data

(63) Continuation-in-part of application No. 09/705,916, filed on Nov. 6, 2000, now Pat. No. 6,421,970, which is a continuation-in-part of application No. 09/637,114, filed on Aug. 11, 2000, now Pat. No. 6,418,683, which is a continuation-in-part of application No. 08/894,966, filed as application No. PCT/SE96/00256 on Feb. 29, 1996, now Pat. No. 6,101,778.

(30) Foreign Application Priority Data

Mar. 7, 1995 (SE) ................................. 9500810

(51) Int. Cl.$^7$ ............................. E04C 3/00; E04C 3/30
(52) U.S. Cl. .................... 52/578; 52/591.1; 52/592.2; 52/586.1; 52/592.1; 403/381; 403/364
(58) Field of Search .................. 52/578, 403.1, 52/594, 592.1, 282.1, 591.1, 592.2, 582.1, 586.1, 591.3, 591.4; 403/381, 364

(56) References Cited

U.S. PATENT DOCUMENTS

| 714,987 | A | 12/1902 | Wolfe |
|---|---|---|---|
| 753,791 | A | 3/1904 | Fulghum |
| 1,124,228 | A | 1/1915 | Houston |
| 1,407,679 | A | 2/1922 | Ruchrauff |
| 1,454,250 | A | 5/1923 | Parsons |
| 1,468,288 | A | 9/1923 | Fen |
| 1,510,924 | A | 10/1924 | Daniels et al. |
| 1,540,128 | A | 6/1925 | Houston |
| 1,575,821 | A | 3/1926 | Daniels |
| 1,602,256 | A | 10/1926 | Sellin |
| 1,602,267 | A | 10/1926 | Karwisde |
| 1,615,096 | A | 1/1927 | Myers |
| 1,622,103 | A | 3/1927 | Fulton |

(List continued on next page.)

FOREIGN PATENT DOCUMENTS

| AU | 199732569 | 12/1999 |
|---|---|---|
| AU | 200020703 | 6/2000 |
| BE | 417526 | 12/1936 |

(List continued on next page.)

OTHER PUBLICATIONS

Patent Mit Inter–nationalem, Die Revolution ((von Grund auf)) Fibo–Trespo, Disstributed at the Domotex fair in Hannover, Germany in Jan. 1996.

Traindustrins Handbok "Snickeriarbete", Knut Larsson, Tekno's Handbocker Publikatin 12–11 (1952).

Trabearbetning Anders Gronlund, TrateknikCentrum.

(List continued on next page.)

Primary Examiner—Lanna Mai
Assistant Examiner—Chi Q Nguyen
(74) Attorney, Agent, or Firm—Stevens, Davis, Miller & Mosher, L.L.P.

(57) ABSTRACT

A building panel, such as a flooring panel or wall panel and a method of assembling the same into a floor, wall cladding, etc. The panel is provided with a locking means in the form of groove (6) and tongue (7) forming a tongue/groove joint for assembling of the panels. In a preferred embodiment, the groove (6) and the tongue (7) are made of water resistant material and formed with a snap-together joint.

33 Claims, 5 Drawing Sheets

U.S. PATENT DOCUMENTS

| | | | |
|---|---|---|---|
| 1,622,104 A | 3/1927 | Fulton | |
| 1,637,634 A | 8/1927 | Carter | |
| 1,644,710 A | 10/1927 | Crooks | |
| 1,660,480 A | 2/1928 | Daniels | |
| 1,714,738 A | 5/1929 | Smith | |
| 1,718,702 A | 6/1929 | Pfiester | |
| 1,734,826 A | 11/1929 | Pick | |
| 1,764,331 A | 6/1930 | Moratz | |
| 1,778,069 A | 10/1930 | Fetz | |
| 1,787,027 A | 12/1930 | Wasleff | |
| 1,823,039 A | 9/1931 | Gruner | |
| 1,859,667 A | 5/1932 | Gruner | |
| 1,898,364 A | 2/1933 | Gynn | |
| 1,906,411 A | 4/1933 | Potvin | |
| 1,929,871 A | 10/1933 | Jones | |
| 1,940,377 A | 12/1933 | Storm | |
| 1,953,306 A | 4/1934 | Moratz | |
| 1,986,739 A | 1/1935 | Mitte | |
| 1,988,201 A | 1/1935 | Hall | |
| 2,004,193 A | 6/1935 | Cherry | |
| 2,276,071 A | 3/1942 | Scull | |
| 2,324,628 A | 7/1943 | Kahr | |
| 2,398,632 A | 4/1946 | Frost et al. | |
| 2,430,200 A | 11/1947 | Wilson | |
| 2,740,167 A | 4/1956 | Rowley | |
| 2,780,253 A | 2/1957 | Joa | |
| 2,894,292 A | 7/1959 | Gramelspacher | |
| 3,045,294 A | 7/1962 | Livezey, Jr. | |
| 3,100,556 A | 8/1963 | Ridder | |
| 3,125,138 A | 3/1964 | Bolenbach | |
| 3,182,769 A | 5/1965 | de Ridder | |
| 3,203,149 A | 8/1965 | Soddy | |
| 3,267,630 A | 8/1966 | Omholt | |
| 3,282,010 A | 11/1966 | King, Jr. | |
| 3,310,919 A | 3/1967 | Bue et al. | |
| 3,347,048 A | 10/1967 | Brown et al. | |
| 3,387,422 A | 6/1968 | Wanzer | |
| 3,460,304 A | 8/1969 | Braeuninger et al. | |
| 3,481,810 A | 12/1969 | Waite | |
| 3,526,420 A | 9/1970 | Brancaleone | |
| 3,535,844 A | 10/1970 | Glaros | |
| 3,538,665 A | 11/1970 | Gohner | |
| 3,553,919 A | 1/1971 | Omholt | |
| 3,555,762 A | 1/1971 | Costanzo, Jr. | |
| 3,694,983 A | 10/1972 | Couquet | |
| 3,714,747 A | 2/1973 | Curran | |
| 3,731,445 A | 5/1973 | Hoffmann et al. | |
| 3,759,007 A | 9/1973 | Thiele | |
| 3,768,846 A | 10/1973 | Hensley et al. | |
| 3,807,113 A | 4/1974 | Turner | |
| 3,859,000 A | 1/1975 | Webster | |
| 3,902,293 A | 9/1975 | Witt et al. | |
| 3,908,053 A | 9/1975 | Hettich | |
| 3,936,551 A | 2/1976 | Elmendorf et al. | |
| 3,988,187 A | 10/1976 | Witt et al. | |
| 4,090,338 A | 5/1978 | Bourgade | |
| 4,099,358 A | 7/1978 | Compaan | |
| 4,169,688 A | 10/1979 | Toshio | |
| 4,242,390 A | 12/1980 | Nemeth | |
| 4,299,070 A | 11/1981 | Oltmanns et al. | |
| 4,426,820 A | 1/1984 | Terbrack et al. | |
| 4,471,012 A | 9/1984 | Maxwell | |
| 4,501,102 A | 2/1985 | Knowles | |
| 4,561,233 A | 12/1985 | Harter et al. | |
| 4,612,745 A | 9/1986 | Hovde | |
| 4,641,469 A | 2/1987 | Wood | |
| 4,653,242 A | 3/1987 | Ezard | |
| 4,703,597 A | 11/1987 | Eggemar | |
| 4,715,162 A | 12/1987 | Brightwell | |
| 4,738,071 A | 4/1988 | Ezard | |
| 4,769,963 A | 9/1988 | Meyerson | |
| 4,819,932 A | 4/1989 | Trotter, Jr. | |
| 4,831,806 A | 5/1989 | Niese et al. | |
| 4,845,907 A | 7/1989 | Meek | |
| 4,905,442 A | 3/1990 | Daniels | |
| 4,940,503 A * | 7/1990 | Lindgren et al. | 156/279 |
| 5,029,425 A | 7/1991 | Bogataj | |
| 5,113,632 A | 5/1992 | Hanson | |
| 5,117,603 A | 6/1992 | Weintraub | |
| 5,165,816 A | 11/1992 | Parasin | |
| 5,179,812 A | 1/1993 | Hill | |
| 5,216,861 A | 6/1993 | Meyerson | |
| 5,253,464 A | 10/1993 | Nilsen | |
| 5,271,564 A | 12/1993 | Smith | |
| 5,295,341 A | 3/1994 | Kajiwara | |
| 5,325,649 A | 7/1994 | Kajiwara | |
| 5,344,700 A | 9/1994 | McGath et al. | |
| 5,348,778 A * | 9/1994 | Knipp et al. | 428/35.8 |
| 5,349,796 A | 9/1994 | Meyerson | |
| 5,390,457 A | 2/1995 | Sjolander | |
| 5,433,806 A | 7/1995 | Pasquali et al. | |
| 5,474,831 A | 12/1995 | Nystrom | |
| 5,497,589 A | 3/1996 | Porter | |
| 5,502,939 A | 4/1996 | Zadok et al. | |
| 5,540,025 A | 7/1996 | Takehara et al. | |
| 5,567,497 A | 10/1996 | Zegler et al. | |
| 5,570,554 A | 11/1996 | Searer | |
| 5,597,024 A | 1/1997 | Bolyard et al. | |
| 5,630,304 A | 5/1997 | Austin | |
| 5,671,575 A | 9/1997 | Wu | |
| 5,706,621 A | 1/1998 | Pervan | |
| 5,797,237 A | 8/1998 | Finkell, Jr. | |
| 5,823,240 A | 10/1998 | Bolyard et al. | |
| 5,827,592 A | 10/1998 | Van Gulik et al. | |
| 5,860,267 A | 1/1999 | Pervan | |
| 5,935,668 A | 8/1999 | Smith | |
| 5,941,047 A * | 8/1999 | Johansson | 52/390 |
| 5,943,239 A | 8/1999 | Shamblin et al. | |
| 5,968,625 A | 10/1999 | Hudson | |
| 5,987,839 A | 11/1999 | Hamar et al. | |
| 6,006,486 A | 12/1999 | Moriau et al. | |
| 6,021,615 A * | 2/2000 | Brown | 428/35.8 |
| 6,023,907 A | 2/2000 | Pervan | |
| 6,029,416 A * | 2/2000 | Andersson | 403/354 |
| 6,094,882 A | 8/2000 | Pervan | |
| 6,101,778 A | 8/2000 | Martensson | |
| 6,119,423 A | 9/2000 | Costantino | |
| 6,134,854 A | 10/2000 | Stanchfield | |
| 6,148,884 A | 11/2000 | Bolyard et al. | |
| 6,182,410 B1 | 2/2001 | Pervan | |
| 6,205,639 B1 | 3/2001 | Pervan | |
| 6,209,278 B1 | 4/2001 | Tychsen | |
| 6,216,403 B1 | 4/2001 | Belbeoc'h | |
| 6,216,409 B1 | 4/2001 | Roy et al. | |
| 6,324,803 B1 | 12/2001 | Pervan | |
| 6,324,809 B1 * | 12/2001 | Nelson | 156/279 |
| 6,332,733 B1 * | 12/2001 | Hamberger et al. | 403/274 |
| 6,365,258 B1 * | 4/2002 | Alm | 428/86 |
| 6,385,936 B1 * | 5/2002 | Schneider | 403/364 |
| 6,421,970 B1 * | 7/2002 | Martensson et al. | 52/282.1 |
| 6,438,919 B1 | 8/2002 | Kauseder | |

FOREIGN PATENT DOCUMENTS

| | | |
|---|---|---|
| BE | 557844 | 3/1960 |
| BE | 1010339 | 6/1998 |
| BE | 1010487 | 10/1998 |
| CA | 991373 | 6/1976 |
| CA | 1169106 | 6/1984 |
| CA | 2226286 | 12/1997 |
| CA | 2252791 | 11/1998 |
| CA | 2289309 | 11/1999 |

| | | |
|---|---|---|
| CH | 200949 | 1/1939 |
| CH | 211877 | 1/1941 |
| DE | 29710175 U1 | 8/1919 |
| DE | 1212275 | 3/1966 |
| DE | 7102476 | 6/1971 |
| DE | 2238660 | 2/1974 |
| DE | 7402354 | 5/1974 |
| DE | 2502992 | 7/1976 |
| DE | 2616077 | 10/1977 |
| DE | 2917025 | 11/1980 |
| DE | 3041781 | 6/1982 |
| DE | 3214207 | 11/1982 |
| DE | 3343601 | 6/1985 |
| DE | 8604004 | 4/1986 |
| DE | 3512204 | 10/1986 |
| DE | 3246376 | 2/1987 |
| DE | 3544845 | 6/1987 |
| DE | 3343601 | 12/1987 |
| DE | 4002547-0 | 8/1991 |
| DE | 4134452 | 4/1993 |
| DE | 4215273 | 11/1993 |
| DE | 1534278 | 2/1996 |
| DE | 19651149 | 6/1998 |
| DE | 19709641 | 9/1998 |
| DE | 20001225 | 7/2000 |
| DE | 19925248 | 12/2000 |
| DE | 20018284 | 1/2001 |
| DE | 20027461 | 3/2001 |
| EP | 0248127 | 12/1987 |
| EP | 0623724 | 11/1994 |
| EP | 0652340 | 5/1995 |
| EP | 0698162 | 2/1996 |
| EP | 0843763 | 5/1998 |
| EP | 0849416 | 6/1998 |
| EP | 0903451 | 3/1999 |
| EP | 0855482 | 12/1999 |
| EP | 0877130 | 1/2000 |
| EP | 0958441 | 1/2000 |
| EP | 0974713 | 1/2000 |
| EP | A20969163 | 1/2000 |
| EP | A20969164 | 1/2000 |
| EP | A30969163 | 2/2000 |
| EP | A30969164 | 2/2000 |
| FI | 843060 | 8/1984 |
| FR | 1293043 | 3/1961 |
| FR | 2568295 | 1/1986 |
| FR | 2630149 | 10/1989 |
| FR | 2637932 | 4/1990 |
| FR | 2675174 | 10/1992 |
| FR | 2691491 | 11/1993 |
| FR | 2697275 | 4/1994 |
| FR | 2712329 | 5/1995 |
| FR | 2781513 | 1/2000 |
| FR | 2785633 | 5/2000 |
| GB | 424057 | 2/1935 |
| GB | 585205 | 1/1947 |
| GB | 599793 | 3/1948 |
| GB | 636423 | 4/1950 |
| GB | 812471 | 4/1959 |
| GB | 812671 | 4/1959 |
| GB | 1237744 | 6/1971 |
| GB | 1430423 | 3/1976 |
| GB | 2117813 | 10/1983 |
| GB | 2126106 | 3/1984 |
| GB | 2256023 * | 5/1991 |
| GB | 2243381 | 10/1991 |
| GB | 2256023 | 11/1992 |
| IT | 812671 * | 4/1959 |
| JP | 5465528 | 5/1979 |
| JP | 57119056 | 7/1982 |
| JP | 3169967 | 7/1991 |
| JP | 5148984 | 6/1993 |
| JP | 6146553 | 5/1994 |
| JP | 656310 | 8/1994 |
| JP | 6320510 | 11/1994 |
| JP | 7076923 | 3/1995 |
| JP | 7180333 | 7/1995 |
| JP | 7300979 | 11/1995 |
| JP | 7310426 | 11/1995 |
| NL | 7601773 | 2/1975 |
| NO | 157871 | 7/1984 |
| NO | 305614 | 5/1995 |
| RU | 363795 | 11/1973 |
| SE | 7114900-9 | 12/1974 |
| SE | 8206934-5 | 6/1987 |
| SE | 501014 | 10/1994 |
| SE | 9301595-6 | 2/1995 |
| SE | 502994 | 3/1996 |
| SE | 509059 | 11/1998 |
| SE | 509060 | 11/1998 |
| SE | 512290 | 2/2000 |
| SE | 512313 | 2/2000 |
| WO | 8402155 | 6/1985 |
| WO | 8703839 | 7/1987 |
| WO | 9217657 | 10/1992 |
| WO | 9313280 | 7/1993 |
| WO | 9401628 | 1/1994 |
| WO | 9426999 | 11/1994 |
| WO | 9627719 | 9/1996 |
| WO | 9627721 | 9/1996 |
| WO | 9630177 | 10/1996 |
| WO | 9747834 | 12/1997 |
| WO | 9824994 | 6/1998 |
| WO | 9824995 | 6/1998 |
| WO | 9940273 | 8/1999 |
| WO | 9966151 | 12/1999 |
| WO | 9966152 | 12/1999 |
| WO | 0006854 | 2/2000 |
| WO | 0063510 | 10/2000 |
| WO | 0066856 | 11/2000 |

OTHER PUBLICATIONS

Bojlesystemet til Junckers boliggulve, Junckers Trae for Livet.

The Clip System for Junckers Sports Floors, Junckers Solid Hardood Flooring, Annex 7, p. ½.

The Clip Systems for Junckers Domestic Floors, Junckers Solid Hardwood Flooring, Annex 8, p. ¼.

Focus, Information Till Alla Medabetare, Jan. 2001, Kahrs pa Domotex i Hannover, Tyskland, 13–16 Jan. 20001.

Opplaering OG Autorisasjon, Fibo–Trespo, ALLOC, Laminatgulvet som Legges Uten Lim.

CLIC, Art–Nr. 110 11 640.

Laminat–Boden, Clever–Clickq.

Pergo, Clic Flooring, Laminatgolv.

Letter to the USPTO dated May 14, 2002, regarding Application No. 90/005,744.

Webster's Dictionary, p. 862, definition of "scarf".

Knight's American Mechanical Dictionary, vol. III, 1876, definition of "scarf".

* cited by examiner

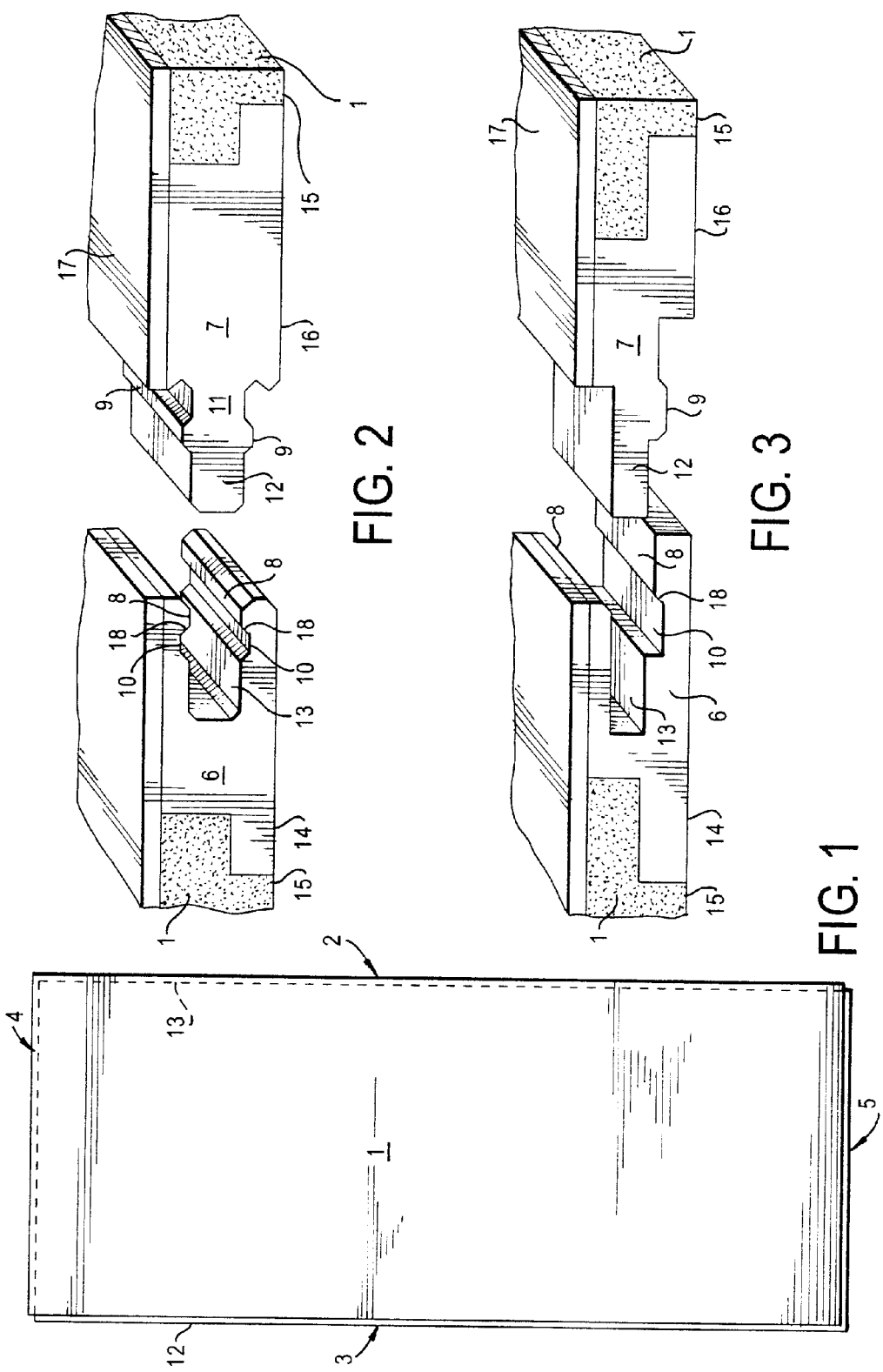

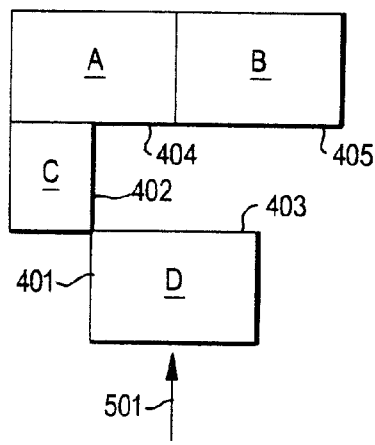
FIG. 13
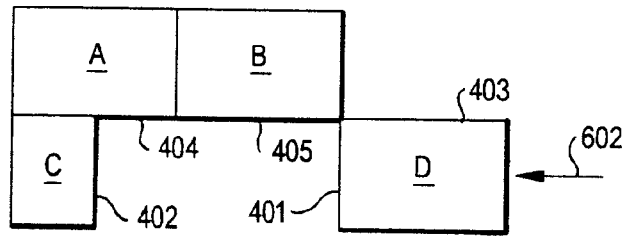
FIG. 14
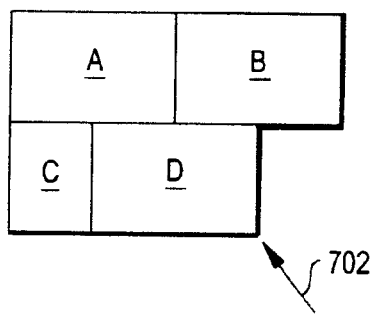
FIG. 15
FIG. 16
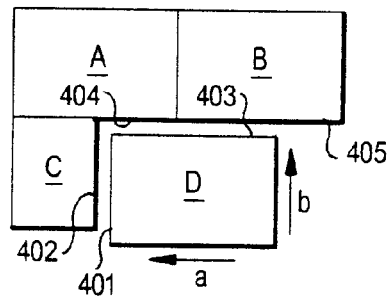

FLOORING PANEL OR WALL PANEL AND USE THEREOF

CROSS REFERENCE TO RELATED APPLICATIONS

This application is a continuation-in-part of U.S. Ser. No. 09/705,916, filed Nov. 6, 2000, now U.S. Pat. No. 6,421,970, which, in turn, is a continuation-in-part of U.S. Ser. No. 09/637,114, filed Aug. 11, 2000, now U.S. Pat. No. 6,418,683, which, in turn, is a continuation-in-part of U.S. Ser. No. 08/894,966, filed Sep. 28, 1997, now U.S. Pat. No. 6,101,778, which is a 371 of PCT/SE96/00256, filed Feb. 29, 1996, the entire disclosures of which are herein incorporated by reference

BACKGROUND OF THE INVENTION

1. Field of the Invention

The present invention relates to a building panel, such as a flooring panel or wall panel and the use thereof to form floors, walls, cladding, etc., by assembling a plurality of the panels. In one embodiment, the panels have particular utility for flooring or cladding a wet room.

2. Description of the Related Art

During the last few years laminated floors have achieved and increased in popularity and on many markets they are beginning to replace parquet floors and wall-to-wall carpets. In the production of laminated floors a decorative thermosetting laminate is first produced. This laminate usually consists of a base layer of paper sheets impregnated with phenol-formaldehyde resin and a decorative surface layer comprising a decor paper sheet impregnated with melamine-formaldehyde resin. The laminate is produced by pressing the different layers at a high pressure and at an increased temperature.

The laminate thus obtained is then glued to a carrier of particle board, for instance, or used as such without any carrier and it is then called compact laminate. The laminated panel thus produced is then sawn up to a number of floor boards which are provided with groove and tongue at the long sides and the short sides thereof. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance.

At the assemblage of such a flooring, glue is normally applied in the groove when the floor boards are assembled. Therefore, it will be difficult to change a damaged board or to remove a whole flooring and, for instance, install it in another room.

To avoid the above problem efforts have been made to achieve floor boards which can be assembled without glue. One such construction is disclosed in the U.S. Pat. No. 5,295,341. There the boards are provided with groove and tongue in the usual way, but here a snap-together system is included in the groove-tongue joint.

These floorboards can be assembled without glue. However, they have the disadvantage that the joints between the boards will be flexible and not rigid. Moreover, the joint between adjacent boards is not tight. This means that if the surface below the floor boards is not completely even, which is usually the case, a gap will be formed between the boards. Into these gaps dirt and water can penetrate.

SUMMARY OF THE INVENTION

According to the present invention, the last mentioned problem has been solved and a building panel, such as a flooring panel or wall panel, preferably of thermosetting laminate having two pairs of parallel side edges has been brought about. Two of these side edges are provided with a locking means in the form of a groove and the other two are provided with a tongue fitting in the groove whereby a tongue/groove joint for assembling of the panels is formed. The groove and the tongue are made of a water resistant or water tight material and formed with a snap-together joint including one or more snapping webs or the like with corresponding cooperating snapping grooves. In one embodiment, the groove in front of the snap-together joint has an entrance opening and continues inside the snap-together joint into a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained. In other embodiments, where the effect provided by the stabilizing groove and stabilizing part is not desired, these stabilizing parts can be omitted.

According to one preferred embodiment two adjacent side edges of the panel are provided with a groove and the other two side edges with a tongue. In this embodiment, the panel is usually quadrilateral, such as rectangular, but it can also be square.

In square panels it is also possible to provide a pair of parallel sides with a groove and the other pair with a tongue. However, the choice of pattern on the surface layer of the panel is limited with this shape. In other embodiments, the perimeter of the panel comprises three or five, or more, such as six or eight, side edges and the arrangement of the grooves and tongues can be varied. The series of panels which are connected to form a floor, wall, or other system need not all be of the same shape.

It is preferred that the groove and the tongue are made of a water proof or water resistant material, such as a thermoplastic, a thermosetting laminate, aluminum or a cellulosic product such as a wood fiber board, chipboard or particle board or a veneer impregnated or coated with a waterproofing material, such as oil, wax or a thermoplastic or thermosetting substance including, but not limited to, polymeric resins. It has been found that treating the panel with a liquid plastic substance such as a polyurethane gives excellent results. Of course, also other waterproof, water tight or water resistant materials can be used.

In another embodiment, the groove, as well as the tongue, are formed as a ledge fixed to the side edges of the panel. Suitably the ledge-formed groove and tongue respectively are then fixed in a recess along the side edges with glue, for instance. Alternatively, the integral tongue and groove portions of the panels can be formed in either the base material, the laminate material and/or both.

Protrusions which form the snapping webs can be formed on the upper and/or lower side of the tongue while cooperating depressions which form the snapping grooves are formed in the groove.

In one preferred embodiment one snapping web is formed on the upper side of the tongue and one on the lower side thereof while the groove has two fitting snapping grooves one at the top and one at the bottom of the groove. These snapping webs may be diametrically opposite one another or offset from one another. The corresponding snapping grooves will be positioned according to the position of the snapping webs so as to cooperate therewith. In an alternative, but equally preferred embodiment, the tongue may be provided with an uneven number of snapping webs on the upper and lower side of the tongues, e.g., none above and one below, one above and two below, etc.

If necessary one pair of snapping webs can be formed on the upper side of the tongue and one pair on the lower side thereof. Of course, you then need two snapping grooves at the top and two snapping grooves at the bottom of the groove to fit with the snapping webs. This construction will give an extremely strong joint.

Of course, in all these embodiments, the snapping webs can be arranged in the groove and the snapping grooves on the tongue. A greater number of snapping webs may also be positioned above the tongue than below the tongue without departing from the invention.

In the preferred embodiment using the stabilizing parts, the width of the stabilizing part is 1–10 mm, preferably 2–10 mm, most preferably 4–10 mm. Generally, a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels. Of course, without any substantial gap between the panels, water and dirt are prevented from entering the assembled panels, flooring or wall covering.

As a safeguard against water penetration a seal might be arranged in the inner part of the stabilizing groove for instance. Alternatively, by selectively engineering the materials used in the tongue and/or groove portions of the panel of water resistant or water proof materials of suitable geometry and elastic modulus, the snapping action can be facilitated by permitting displacement or flexing of the elements defining the tongue and/or groove while the resilience permits snapping of the locking feature to bring said panels into forming a tight joint such that the joint is said to be waterproof or water tight. A joint is water tight when standing water will not penetrate the joint for several hours.

Notwithstanding that the joint is tight to the point of being waterproof or water tight, the panels may be dismountable from each other after snapping the panels together.

Preferably the grooves and the tongues run the full length of the side edges of the panels, although they may be intermittently interrupted along the length of the panels.

The panels can be designed in such a manner that the underside of the groove and/or the tongue are situated in the same level as the underside of the panel.

The panels can be used for covering floors and walls in ordinary dry rooms. However, due to the tight joints and in other cases due to the rigid and water tight joints, the panels can be used also for wet rooms. For such applications the whole panel is preferably made of plastic or thermosetting laminate of so-called compact laminate type. Such a laminate does not absorb water.

Another alternative is a water resistant and/or non water-absorbing base with a water tight surface. The surface may, for instance, consist of a paint, a thermoplastic foil such as polyethylene, polypropylene or polyvinyl chloride, a paper sheet impregnated with a resin, such as a thermosetting or UV-curing resin such as one comprising acrylate and a maleimide, or of a thermosetting laminate.

One suitable non water-absorbing base is a board produced by pressing and consolidating wood particles or wood chips impregnated with a thermoplastic.

The invention will be further explained in connection with the enclosed figures.

BRIEF DESCRIPTION OF THE DRAWINGS

FIG. 1 schematically shows a panel 1 according to the invention seen from above. The panel is drawn as a rectangular shape but it can just as well be square or other quadrilateral.

FIGS. 2 and 3 show a cross section through two adjacent edges of two embodiments of a panel where two such panels are to be assembled.

FIGS. 13–16 disclose various methods of assembling the panels into a finished structure, such as a floor.

DETAILED DESCRIPTION OF THE PREFERRED EMBODIMENTS

Figure 4:
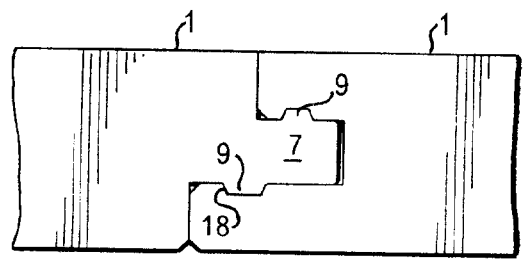
FIG. 4 is a schematic representation of a joint between two panels containing offset snapping webs on the tongue.

The panel 1 consists of a base of cellulosic materials, such as wood particles impregnated with a resin, such as a thermoplastic material, with a decorative thermosetting laminate as a surface layer 17 glued on top.

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap-together joint. In the embodiment shown in FIG. 2, the snap-together joint consists of two snapping webs 9, one on the upper side of the tongue 7 and one on the lower side of tongue, these webs 9 cooperating with two fitting snapping grooves 10.

In front of the snap-together joint, which means the snapping webs 9 and the snapping groove 10, the groove 6 has an entrance opening 8. Inside the snap-together joint the groove 6 continues in a stabilizing groove 13.

The tongue 7 is formed with a rear neck 11 intended to fit in the entrance opening 8 of the groove 6. In front of the snap-together joint the tongue 7 has a forwardly protruding stabilizing part 12 intended for a tight fit in the stabilizing groove 13.

The parts 9 and 10 included in the snap-together joint are also adapted to each other to give a tight fit and strong joint. To increase this effect further the snapping grooves 10 are provided with undercut edges 18 which cooperate with the backside of the snapping webs 9 with the same undercut. As can be seen in various of the drawing figures of the panels, the undercut edges 18 slope downwardly from a distal edge of the panel towards the panel. The angle of slope is not critical. Although, in some embodiments, the angle represents a vertical drop, in many embodiments the slope is not vertical.

In the embodiment of FIGS. 2 and 3, the groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1. In the embodiments of FIGS. 4–12, the tongue and groove are formed of the same material as the body of the panel. Thus, when the body of the panel comprises a carrier of a resin impregnated cellulosic material, such as fiber board, the tongue and groove are formed of the same material as the carrier of the panel. In other embodiments, the base or carrier itself can be formed of a water repellent material, such as plastic. When pushed together, the panels make a distinctive sound, which we have nicknamed the "click" system.

When connecting panels have been assembled by the snap-together joints and the stabilizing parts 12 inserted in the stabilizing grooves 13, the panels are fixed to each other and prevented from unintentional separation. A rigid floor covering or wall covering with water tight joints and without unintentional gaps between the panels is obtained. The usual rotation of the snapping webs 9 in the snapping grooves 10 is prevented by the stabilizing parts 12 in the stabilizing grooves 13. Accordingly these parts are essential for the possibility to get a rigid joint between the panels.

The embodiment shown in FIG. 3 is very similar to that according to FIG. 2. The difference is that only the under side of the tongue 7 is provided with a snapping web 9. The upper side is lacking a snapping web. Accordingly there is only one snapping groove 10 at the bottom of the groove 6.

The embodiment of FIG. 4, though similar to FIG. 2 in having the upper and lower sides of tongue 7 provided with snapping webs 9, such snapping webs are longitudinal displaced along tongue 7.

Figure 5:
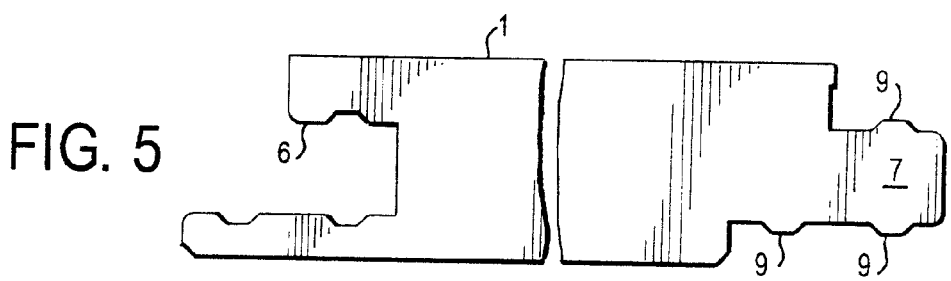
FIGS. 5–7 are schematic representations of three other embodiments showing different placements, number and arrangements of snapping webs and snapping grooves on panels.

The embodiment of FIG. 5 shows the provision of an uneven number of snapping webs 9 on tongue 7 where an upper and lower snapping web are vertically aligned but a third snapping web, positioned on the underside of the tongue 7 is longitudinally displaced at a distance towards the main body of the carrier.

Figure 6:
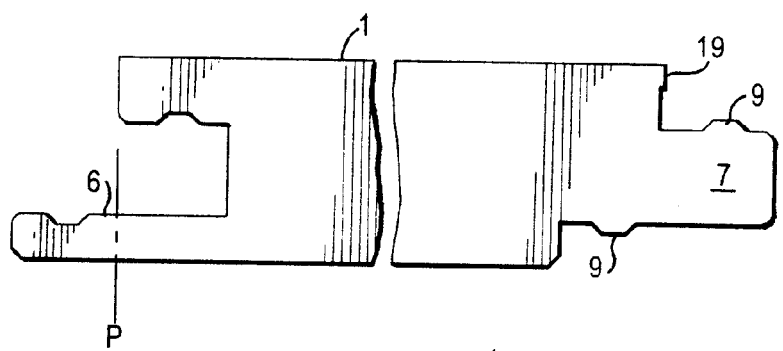

In FIG. 6 is illustrative of a further embodiment, similar to that of FIG. 4 in having longitudinally displaced upper and lower snapping webs 9. However, in FIG. 6 is provided a nose 19 on the upper edge of panel 1, proximate the tongue side of the panel. Such nose 19 assists in providing a tight joint when similar panels are assembled together. The nose may alternatively be provided on the groove side of the panel or further on both the tongue and groove sides of the panel.

Figure 7:
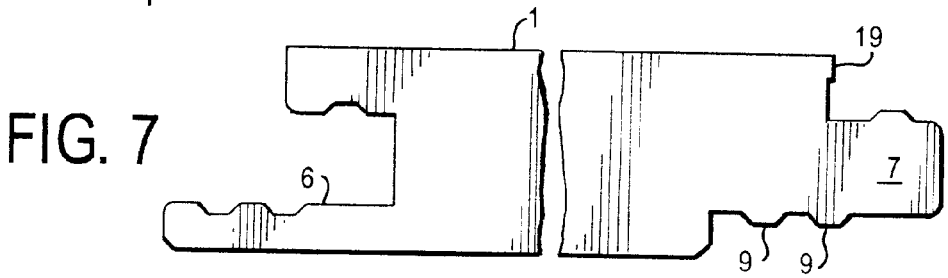

FIG. 7 illustrates the same type of nose 19 as in FIG. 6, however, in this embodiment, the lower snapping webs 9 are both longitudinally displaced towards the main body of panel 1 such that the most distal snapping web 9 lies vertically beneath nose 19 and the other snapping web 9 is inwardly positioned.

Figure 8:
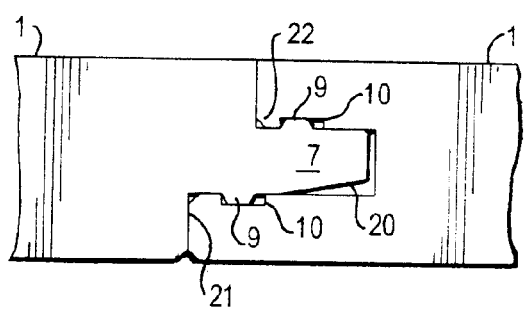
FIG. 8 is a schematic representation of a joint between two assembled panels in another embodiment of the invention.

The embodiment of FIG. 8 illustrates a unique design for both tongue 7 and snapping webs 9 and snapping grooves 10. In this embodiment, tongue 7 is undercut so as to provide a sloping surface 20. Moreover, the walls of the backsides of snapping webs 9 and the corresponding walls of snapping grooves 10 are vertical, or nearly so. This configuration permits at least one of the panels to be tilted relative to the other panel to provide for disassembly of the floor panels. The sloped surface 20 accommodates such tilting and thus, the disassembly of the panels. Moreover, the radius covers 21, 22 of the panels edges facilitate the "turning" of the assembled panels away from each other.

As in the embodiments of FIGS. 2 and 3, each of the embodiments of FIGS. 4–8 may comprise an upper surface of a thermosetting laminate, a plastic foil such as an olefin plastic, paper sheets impregnated with a thermosetting or UV-curing resin comprising acrylate and a maleimide or similar materials.

Figure 9:
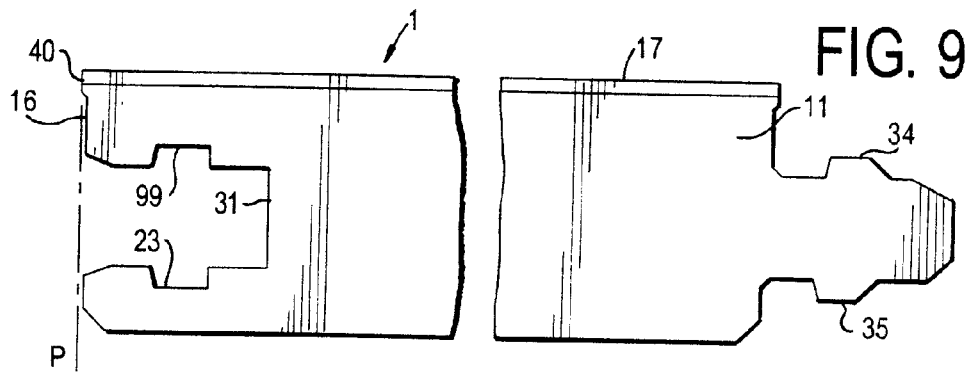
FIGS. 9–12 are schematic representations of four other alternative embodiments showing different placements, number and arrangements of snapping webs and snapping grooves on panels.

In FIGS. 9–12, a panel 1 comprises a base of cellulosic material 11 with a decorative surface 17. The decorative surface 17 can be a thermosetting laminate, a plastic foil, such as an olefin plastic, paper sheets impregnated with a thermosetting or UV-curing resin comprising acrylate and a maleimide or similar materials. The cellulosic material 11 is the same as or similar to that used in the embodiments of FIGS. 1–8. However, as shown in FIG. 9, groove 16 contains an upper snapping groove 99 and a lower snapping groove 23. While each of groove 99 and 23 are vertically overlapping with each other, they are not coextensive. Snapping groove 99 is positioned proximate the groove edge 31 and snapping groove 23 extends further distal to groove edge 31, though both groove 99 and groove 23 are located with an imaginary vertical plane P extending through the top of panel edge 40. In each of the various embodiments illustrating vertical plane P, the upper edge is located as shown by 40 in FIG. 9. On the tongue side of panel 1 of FIG. 9 are two snapping webs 34, 35, configured and located so as to snap into cooperating grooves 99 and 23 on an identical panel (not shown).

Figure 10:
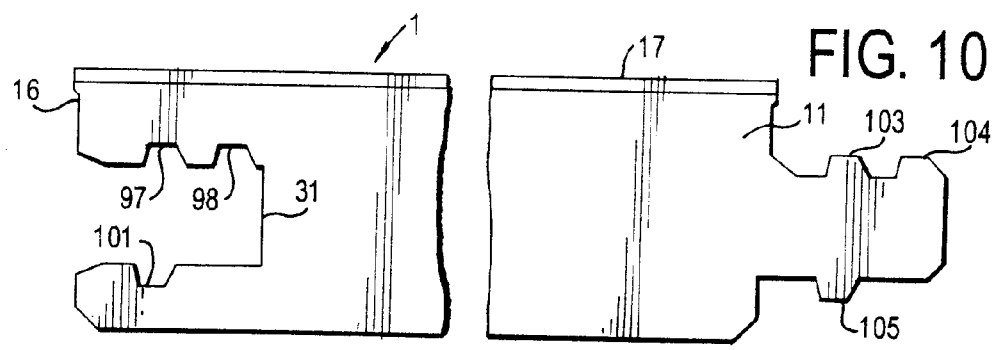

In FIG. 10, is a panel constructed similarly to that of FIG. 9, with the modification that two upper snapping grooves 97, 98 and one lower snapping groove 101 are provided. As can be seen in FIG. 10, the upper and lower snapping grooves engage with corresponding upper snapping webs 103, 104 and lower snapping web 105 when a similar panel 1 is located so as to check or snap into place.

Figure 11:
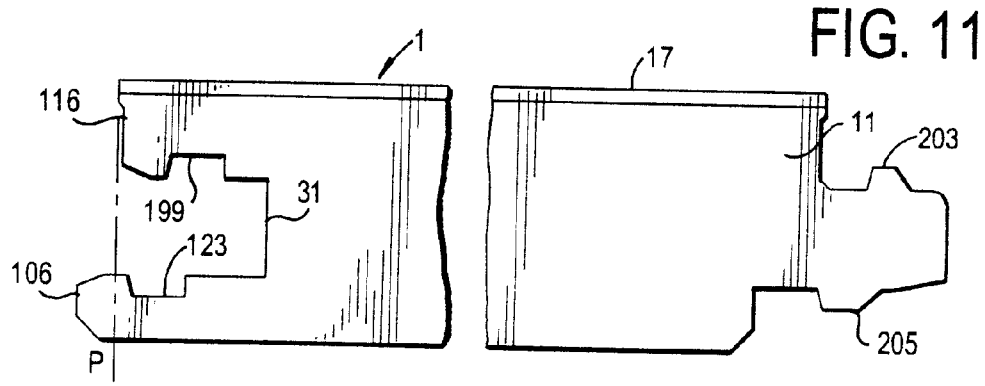

FIG. 11 is similar to FIG. 9 except that the position of upper and lower snapping grooves 199, 123, respectively, are offset as shown. Additionally, lower web 106 of groove edge 31 extends distally beyond plane P which is an imaginary vertical plane extending through the top web 116 of groove 31.

Snapping webs 203, 205 are configured so as to be received with corresponding snapping grooves 199, 123, respectively, when an identical panel is horizontally pushed into place.

Figure 12:
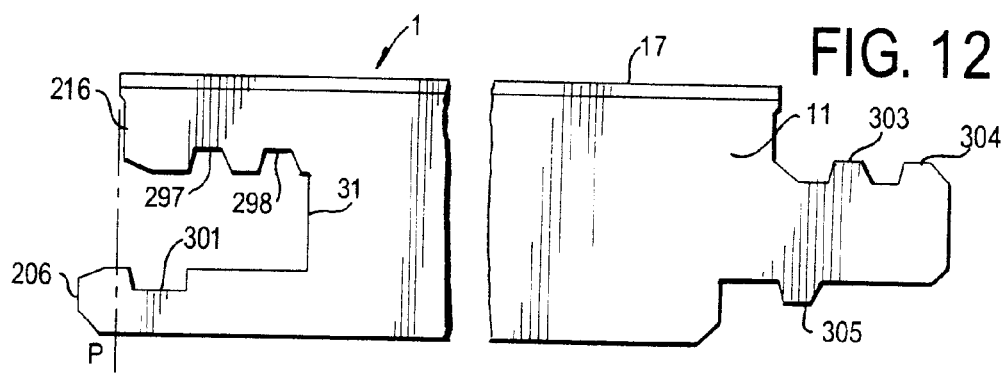

FIG. 12 is similar to FIG. 10 except insofar as the lower web 206 extends distally beyond imaginary plane P extending vertically from the top edge 216 of groove 31. As in the previous figures, upper and lower snapping webs 303, 304, 305 are configured so as to be matingly received in snapping grooves 297, 298 and 301 of an identical panel.

FIGS. 13–15 are illustrative of various ways to assemble the panels according to the invention. In each of these Figs. A and B represent two panels assembled in a first row, C represents a first panel assembled in a second row and D represents a new panel to be assembled so as to adjoin said first and second rows. All of such new panels D are assembled by horizontally pushing the new panel D in one of the following steps.

In FIG. 13, new panel D is engaged at its "short side" 401 with a short side 402 of panel C and is horizontally pushed in the direction of arrow 501 so as to slide along the short side 402 of panel C with panel D's respective upper and lower snapping webs are received in the respective upper and lower snapping grooves of panel C and until the "long sides" 403 of panel D engages with the edges 404, 405 of panels A and B.

In the alternative installation method of FIG. 14, new panel D is engaged at its long side 403 with the long side 405 of panel B and horizontally moved along arrow 602 until panel D's short side 401 engages with short side 402 of panel C. The horizontal motion does not require that any of the panels be "tilted" or "angled" out of the plane of the paper in order to joint the new panel D with any of the previously laid panels A-C.

Still further, new panel D may be simultaneously assembled with short side 402 of panel C and the long sides 404 and 405 of panels A and B by exerting a force in the direction of arrow 202 as shown in FIG. 15. A special tapping block (not shown) configured to engage with the tongue and groove segments of new panel D can be used to horizontal urge panel D into simultaneous engagement with each of panels A, B, and C.

FIG. 16 shows a "double" horizontal push method of assembling a new panel into engagement with previously laid panels. In this embodiment, new panel D is placed with its long side 403 at a distance (for instance, 2 cm) from the long sides 404 and 405 of panels A and B, respectively. Then the new panel D is pushed horizontally in the direction of arrow "a" until the short side of 401 of panel D snaps together with the short side 402 of panel C. Then, panel D is pushed horizontally in the direction of arrow "b" (while still engaged with panel C along the joint formed by short side 402 of panel C and short side 401 of panel D) until the side 403 of panel D snaps together with the long sides 404 and 405 of panels A and B, respectively.

Figure 17:
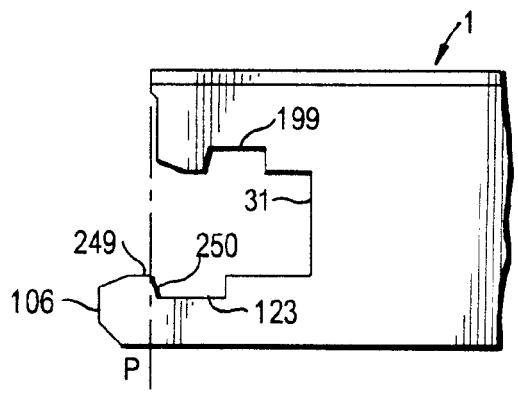
FIGS. 17–19 are partially sectional views through the groove side of the panels of the invention which show the various positions of a snapping groove in relation to an upper edge of the panel and a plane P passing vertically downward from said upper edge.
Figure 18:
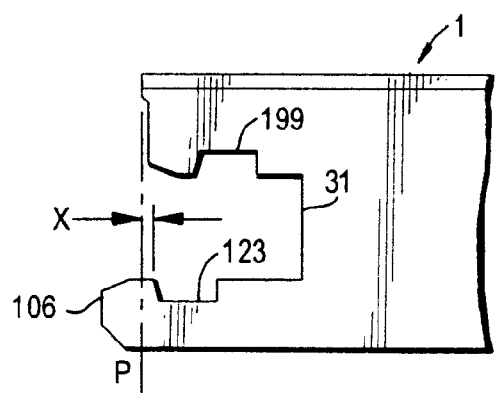

FIGS. 17–18 illustrate various locations for the placement of the imaginary plane P with regard to the distal corner of the rear wall of the lower snapping groove. Thus, in FIG. 17 (which is similar to FIG. 11), the plane P may intersect the upper corner 249 of the rear wall 250 of the lower snapping groove 123.

FIG. 18 shows that the corner 249' is placed slightly inwardly of plane P at a distance X which can be as little as 0.04 to 0.10 mm inside (towards the panel) of plane P. Of course, other embodiments, such as FIGS. 9–12, show the plane P passing quite outside the snapping groove.

Figure 19:
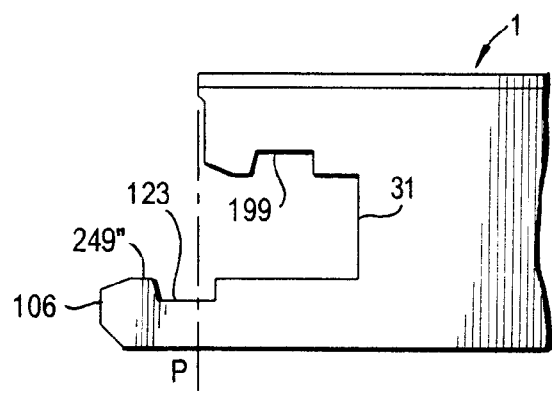

FIG. 19 is a further embodiment illustrating the passage of plane P through the snapping groove 123 with the corner 249" well distal of plane P.

Of course, FIG. 6 shows snapping groove 23 well distal of plane P.

It will be understood by those skilled in the art that the tongue side of panel 1 in each of FIGS. 17–19 has a configuration to mate with the snapping grooves 123 of FIGS. 17–19.

Thus, we have disclosed not only a configuration of making panels having unique tongue and groove configurations which permit "glueless" assembly of the panels by a click system, but also a method of assembling such panels into a finished structure, such as a floor.

The body of the panels in the embodiments are intended to be assembled without glue, but certainly glue or other sealing substance could be applied to the vicinity of the joint. Especially in the embodiments where the panels are intended to be installed in or proximate wet rooms, but also in ordinary rooms, the panels, especially the tongue and groove portions, can be coated or impregnated with a waterproofing material, such as an oil, wax, paint or other waterproofing material such as a liquid plastic coating, like polyurethane.

Alternatively, instead of a waterproof or water resistant layer on a carrier, the entire panel body can be made of a waterproof material, such as plastic, in which case the tongue and groove portions may be made of the same material as, and a unitary part of, the panel.

In still another embodiment of the invention, the joints can be "pre-glued," i.e., have a glue system applied at the factory which glue system can be activated upon assembly of the panels 1 into a finished structure, such as a floor. For example, the friction applied by assembling the panels as in FIGS. 13–16 can be used to rupture microballoons containing a catalyst or other component of an adhesive system to cause the assembled panels to be adhesively connected at the joint upon assembly.

Alternatively, the tongue portion of the panels can be pre-coated with one component of a two component adhesive system and the groove portion can be pre-coated with another component of the two component system, such that upon assembly of the tongue and groove portions of two adjacent panels, the adhesive system is activated to cause the panels to be adhesively connected at their joint.

It is within the scope of this adhesive system to include a blowing agent so as to form a foam filled adhesive. Alternatively, the adhesive may act more as a sealant, sealing the joint against ingress of water or other liquids when the panels are assembled into a structure, such as a floor.

Other adhesive systems, such as the use of initiators, inclusion of blowing or gas generating agents, multipart systems, such as a two resin system comprising parts one and two, wherein the catalyst or curing agent for part one is included with the part two resin and the catalyst or curing agent for part two is included with the part one resin may be applied at the factory, and initiated when the panels are installed.

Initiation may also occur when a protective strip is removed from the panel edges just prior to assembly of the panel, the removal of the protective strip exposing reactive components of the adhesive system.

Such modifications of the above pre-glued system will be apparent to those skilled in the art upon reading this disclosure.

It should be appreciated that we have provided a building panel and method of assembling the same which will result in tight joints between panels such that the assembled panels, used as flooring or cladding, which will be water repellent, that is, impervious to water standing on the surface of the joint, whether or not a pre-glued system is applied to the panel.

The invention is not limited to the embodiments shown and described since these may be readily modified by those of ordinary skill in the art to which this invention pertains without departing from the scope of the appended claims.

We claim:

1. A method of forming a joint between similar panels, said method comprising:

providing a series of panels, said panel defining a perimeter, said perimeter defining at least three sides of said panel, providing at least one tongue or groove shape along said sides, defining at least two protrusions on at least one of said tongue or groove to act as a snapping web and defining at least two depressions on at least one of said tongue and groove, the at least two depressions being positioned so as to act as a snapping groove to receive said snapping web, and urging the panels together to form said joint wherein said snapping web and snapping groove urge the panels together to form said joint wherein at least one of said at least two protrusions are vertical offset from at least one other of said at least two protrusions.

2. The method of claim 1, wherein the panels are quadrilateral and two sides have tongues and two sides have grooves and the panels are assembled by snapping the tongues into said grooves.

3. The method of claim 1, wherein said protrusions are on said tongue and the panels are assembled by snapping said protrusions into depressions in said groove.

4. The method of claim 1, wherein said panels maybe disassembled by rotating at least one of said panels about said joint to dismount said panels.

5. The method of claim 3, wherein there is at least one additional protrusions on said tongue.

6. The method of claim 5, further comprising providing at least one additional depression in said groove so as to cooperate with each of said at least one additional protrusions.

7. A system for forming a wall, floor or cladding by assembling a plurality of panels into an interlocked unit, said system comprising:

a plurality of panels, each of said panels defining a perimeter having at least three sides;

each of said sides being provided with at least one of a tongue or a groove, said panel comprising an upper surface formed of paint, a thermoplastic foil, a paper impregnated with a thermosetting or UV-curing resin, or a thermosetting laminate; at least one of the tongue and groove being provided with at least two protrusions and the other being provided with at least two depressions cooperating with said protrusions to form a snapping web and snapping groove, respectively; said snapping web and snapping groove forcing adjacent panels towards the joint when said panels are snapped together, wherein at least one of said at least two protrusions are vertically offset from at least one other of said at least two protrusions.

8. The system of claim 7, wherein at least one of the panels comprises a nose extending outwardly along an upper surface of the perimeter.

9. The system of claim 7, wherein the panels are quadrilateral.

10. The system of claim 7, wherein the joints formed in said interlocked unit are water resistant.

11. The system of claim 7, wherein the panels are formed of an upper surface adhered to a base layer and the base layer is treated so as to increase its water resistance properties.

12. The system of claim 7, wherein the base layer is formed of a compressed cellulosic impregnated or coated with a wax, an oil, or a resin.

13. A building panel, said panel having a perimeter defining at least three sides, said sides being provided with at least one of a tongue or a groove, said panel comprising an upper surface formed of a paint, a thermoplastic foil, a paper impregnated with a thermosetting or UV-curing resin or a thermosetting laminate; at least one of said tongue and groove being provided with at least two protrusions and the other being provided with at least two depressions cooperating with said protrusions to form a snapping web and snapping groove, respectively; said snapping web and snapping groove forcing adjacent panels towards the joint where said panels are snapped together, wherein at least one of said at least two protrusions are vertically offset from at least one other of said at least two protrusions.

14. The building panel of claim 13, wherein said panel is a quadrilateral.

15. The building panel of claim 14, wherein there is at least one additional protrusion in addition to said at least two protrusions.

16. The building panel of claim 14, wherein said protrusions are even in number and are vertically offset.

17. The building panel of claim 15, wherein none of said protrusions are diametrically opposed.

18. The building panel of claim 15, wherein there are at least three protrusions, two of which are diametrically opposed.

19. The building panel of claim 14, wherein there are an even number of protrusions, but they are longitudinally displaced from each other.

20. The building panel of claim 19, wherein the tongue on which the protrusions are located has a truncated lower surface.

21. The method of claim 1, further comprising placing a sealant within said joint.

22. The method of claim 21, wherein said sealant is a preglue, wherein said preglue is applied at a factory and activated upon assembly of the panels.

23. The method of claim 21, further comprising applying a preglue to at least one of the tongue and groove shapes at a factory.

24. The method of claim 23, wherein the preglue is applied to both the tongue and groove shapes at a factory.

25. The method of claim 23, further comprising activating the preglue upon assembly of the panels.

26. The system according to claim 7, further comprising a sealant between said tongue and groove portions.

27. The system according to claim 26, wherein said sealant is a preglue, wherein said preglue is applied at a factory and activated upon assembly of the panels.

28. The system according to claim 26, further comprising a preglue on at least one of the tongue and groove shapes.

29. The system according to claim 27, wherein the preglue is on both the tongue and groove shapes.

30. The building panel of claim 13, further comprising a sealant on at least one of the tongue and groove.

31. The building panel of claim 30, wherein said sealant is a preglue.

32. The building panel of claim 30, wherein a preglue is on at least one of the tongue and groove.

33. The building panel of claim 32, wherein the preglue is on both the tongue and glue.

* * * * *